(12) United States Patent
Vandame et al.

(10) Patent No.: US 12,192,439 B2
(45) Date of Patent: Jan. 7, 2025

(54) METHOD AND DEVICE FOR PROCESSING IMAGE CONTENT

(71) Applicant: InterDigital VC Holdings, Inc., Wilmington, DE (US)

(72) Inventors: Benoit Vandame, Betton (FR); Didier Doyen, Cesson-Sévigné (FR); Guillaume Boisson, Pleumeleuc (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 92 days.

(21) Appl. No.: 17/800,119

(22) PCT Filed: Feb. 19, 2021

(86) PCT No.: PCT/US2021/018685
§ 371 (c)(1),
(2) Date: Aug. 16, 2022

(87) PCT Pub. No.: WO2021/168185
PCT Pub. Date: Aug. 26, 2021

(65) Prior Publication Data
US 2023/0072247 A1      Mar. 9, 2023

(30) Foreign Application Priority Data

Feb. 19, 2020 (EP) .................................... 20305158

(51) Int. Cl.
*H04N 13/395* (2018.01)
*G06T 5/50* (2006.01)
(Continued)

(52) U.S. Cl.
CPC .............. *H04N 13/395* (2018.05); *G06T 5/50* (2013.01); *G06T 7/11* (2017.01); *G06T 7/90* (2017.01);
(Continued)

(58) Field of Classification Search
CPC ........... H04N 13/395; G06T 5/50; G06T 7/11; G06T 7/90; G06T 2207/10024;
(Continued)

(56) References Cited

U.S. PATENT DOCUMENTS 10,127,712 B2    11/2018  Carothers et al.
2002/0113787 A1*  8/2002  Ray ...................... H04N 13/275
                                                      348/E13.057

(Continued)

OTHER PUBLICATIONS

Flynn et al, DeepView:: View Synthesis With Learned Gradient Descent, Institute of Electrical and Electronics (IEEE) ,2019 IEEE/CVF Conference on Computer Vision and Pattern Recognition( CVPR), Jun. 15, 2019, LongBeach, California, USA, 10pages. (Year: 2019).*

(Continued)

*Primary Examiner* — Michael Le
(74) *Attorney, Agent, or Firm* — Condo Roccia Koptiw LLP

(57) ABSTRACT

A method and system are provided for processing image content. In one embodiment the method comprises receiving a plurality of captured contents showing same scene as captured by one or more cameras having a different focal length and depth maps and generating a consensus cube by obtaining depth map estimations from said received contents. The visibility of different objects in then analysed to create a soft visibility cube that provides visibility information about each content. A color cube is then generated by using information from the consensus and soft visibility cube. The color cube is then used to combine different received contents and generate a single image for the plurality of contents received.

20 Claims, 11 Drawing Sheets

(51) Int. Cl.
*G06T 7/11* (2017.01)
*G06T 7/90* (2017.01)
*G06V 10/74* (2022.01)

(52) U.S. Cl.
CPC .. *G06V 10/761* (2022.01); *G06T 2207/10024* (2013.01); *G06T 2207/20221* (2013.01)

(58) Field of Classification Search
CPC ....... G06T 2207/20221; G06T 2200/21; G06T 2207/10052; G06T 15/10; G06T 2200/12; G06V 10/761
See application file for complete search history.

(56) References Cited

U.S. PATENT DOCUMENTS

| | | | |
|---|---|---|---|
| 2002/0163482 A1* | 11/2002 | Sullivan | H04N 13/395 348/E13.058 |
| 2005/0030317 A1* | 2/2005 | Spicer | G06T 11/001 345/582 |
| 2016/0247310 A1* | 8/2016 | Hui | G06T 3/4092 |
| 2018/0184121 A1* | 6/2018 | Kim | H04N 19/176 |
| 2018/0199065 A1 | 7/2018 | Adams et al. | |
| 2019/0297332 A1* | 9/2019 | Zheng | H04N 19/36 |
| 2020/0236377 A1* | 7/2020 | Choi | H04N 19/129 |
| 2021/0090301 A1* | 3/2021 | Mammou | G06T 7/11 |

OTHER PUBLICATIONS

Vandame et al., "Pipeline for Real-Time Video Synthesis", Institute of Electrical and Electronics (IEEE), 2020 IEEE International Conference on Multimedia & Expo Workshops (ICMEW), London, United Kingdom, Jul. 6, 2020, 6 pages.

Nguyen et al., "Predictive Tile Selection for 360-Degree VR Video Streaming in Bandwidth-Limited Networks", Institute of Electrical and Electronics (IEEE), IEEE Communications Letters, vol. 22, Issue: 9, Sep. 2018, 4 pages.

Flynn et al., "DeepView: View Synthesis With Learned Gradient Descent", Institute of Electrical and Electronics (IEEE), 2019 IEEE/CVF Conference on Computer Vision and Pattern Recognition (CVPR), Jun. 15, 2019, Long Beach, California, USA, 10 pages.

Penner et al., "Soft 3D reconstruction for view synthesis", Association for Computing Machinery (ACM), ACM Transactions on Graphics, vol. 36, Issue 6, Article No. 235, Dec. 2017, 11 pages.

Zhou et al., "ClusTile: Toward Minimizing Bandwidth in 360-degree Video Streaming", Institute of Electrical and Electronics (IEEE), IEEE Infocom 2018—IEEE Conference on Computer Communications, Apr. 16, 2018, Honolulu, Hawaii, USA, 9 pages.

Wu et al., "Light Field Image Processing: an Overview", Institute of Electrical and Electronics (IEEE), IEEE Journal of Selected Topics in Signal Processing, vol. 11, Issue: 7, Oct. 2017, 29 pages.

\* cited by examiner

A

B

C

D

METHOD AND DEVICE FOR PROCESSING IMAGE CONTENT

CROSS REFERENCE TO RELATED APPLICATIONS

This application is a U.S. National Stage Application under 35 U.S.C. 371 of International Patent Application No. PCT/US2021/018685, filed Feb. 19, 2021, which is incorporated herein by reference in its entirety.

This application claims the benefit of European Application No. 20305158.6, filed Feb. 19, 2020.

TECHNICAL FIELD

The present embodiments relate generally to a method and a device for processing image content. One or more embodiments relate to compress volumetric data in image processing and more particularly to techniques for selecting a subset of data in order to reduce the size of a volumetric data.

BACKGROUND

Conventional cameras capture light from a three-dimensional scene on a two-dimensional sensor device sensitive to visible light. Light sensitive technology used in such imaging devices is often based on semiconductor technology, capable of converting photons into electrons such as, for example, charge coupled devices (CCD) or complementary metal oxide technology (CMOS). A digital image photosensor, for example, typically includes an array of photosensitive cells, each cell being configured to capture incoming light. A 2D image providing spatial information is obtained from a measurement of the total amount of light captured by each photosensitive cell of the image sensor device. While the 2D image can provide information on the intensity of the light and the color of the light at spatial points of the photosensor(s), no information is provided on the direction of the incoming light.

Other types of cameras have been recently developed that provide for a richer and more image intensive product. One such camera is a Light Field camera. Light Field cameras allow to capture a real content from various point of views. The 2 major families of light-field cameras are either: the matrix of cameras; or the plenoptic cameras. A matrix of cameras can be replaced by a single camera which is used to perform many acquisitions from various point of views. The light-field being captured is therefore limited to static scene. With plenoptic cameras, a micro-lens is located between the main-lens and the sensor. The micro-lenses are producing micro-images which correspond to various point of views. The matrix of micro-images collected by the sensor can be transformed into the so-called sub-aperture images which are equivalent to the acquisition obtained with a matrix of cameras. The proposed invention is described considering a matrix of cameras, but would apply equally well to the set of sub-aperture images extracted from a plenoptic camera.

Image capture and processing in general involves generation and storage of volumetric data even when 2D images are involved. When images provide more information and are generally richer in quality, the volume of data is increased by many factors.

Consequently, it is desirous to provide techniques that permit management through data synthesis to compute a specific volumetric data. The objective would be to reduce the volume of data while mainlining image quality.

SUMMARY

A method and system are provided for processing image content. In one embodiment the method comprises receiving a plurality of captured contents showing same scene as captured by one or more cameras having a different focal length and depth maps obtaining depth map estimations from said received contents. In am embodiment a consensus cube may be generated by the depth map estimations. The visibility of different objects can then be analysed to provide visibility information about at least one content. Analysis of the visibility of the objects can be used to create a soft visibility cube providing the visibility information. The visibility information and the depth map estimations can be used to generate a color cube. A color cube can be generated by using information from the consensus and soft visibility cube. The color cube can then be used to combine different received contents and generate a single image for the plurality of contents received.

BRIEF DESCRIPTION OF THE DRAWINGS

Different embodiments of the will now be described, by way of example only, and with reference to the following drawings in which.

DETAILED DESCRIPTION

Light-field image and video processing offers a much richer variety of image manipulation possibilities compared to traditional 2D images. However, capturing of high-quality light-fields is challenging because a huge amount of data has to be captured and managed. Often, a number of different views need to be combined together that are provided in high dynamic range, with excellent color and resolution. In addition, 2D images have to be manipulated so that they can be projected into a three-dimensional plane. In digital images, this involves providing a grid like plane representative of pixels. For every visible point in space, a 2D-image often provides the intensity of one or multiple pixels. In addition, other principals that are associated with stereoscopic images manipulation have to be considered such as providing two different views of a scene. This is because depth management is provided to a user's eye by providing slightly shifted images (parallax) for the left and the right eye to provide the depth impression. These requirements greatly increase the visual experience but they also significantly increase the volume of data that has to be captured, managed and stored and recovered.

Figure 1:
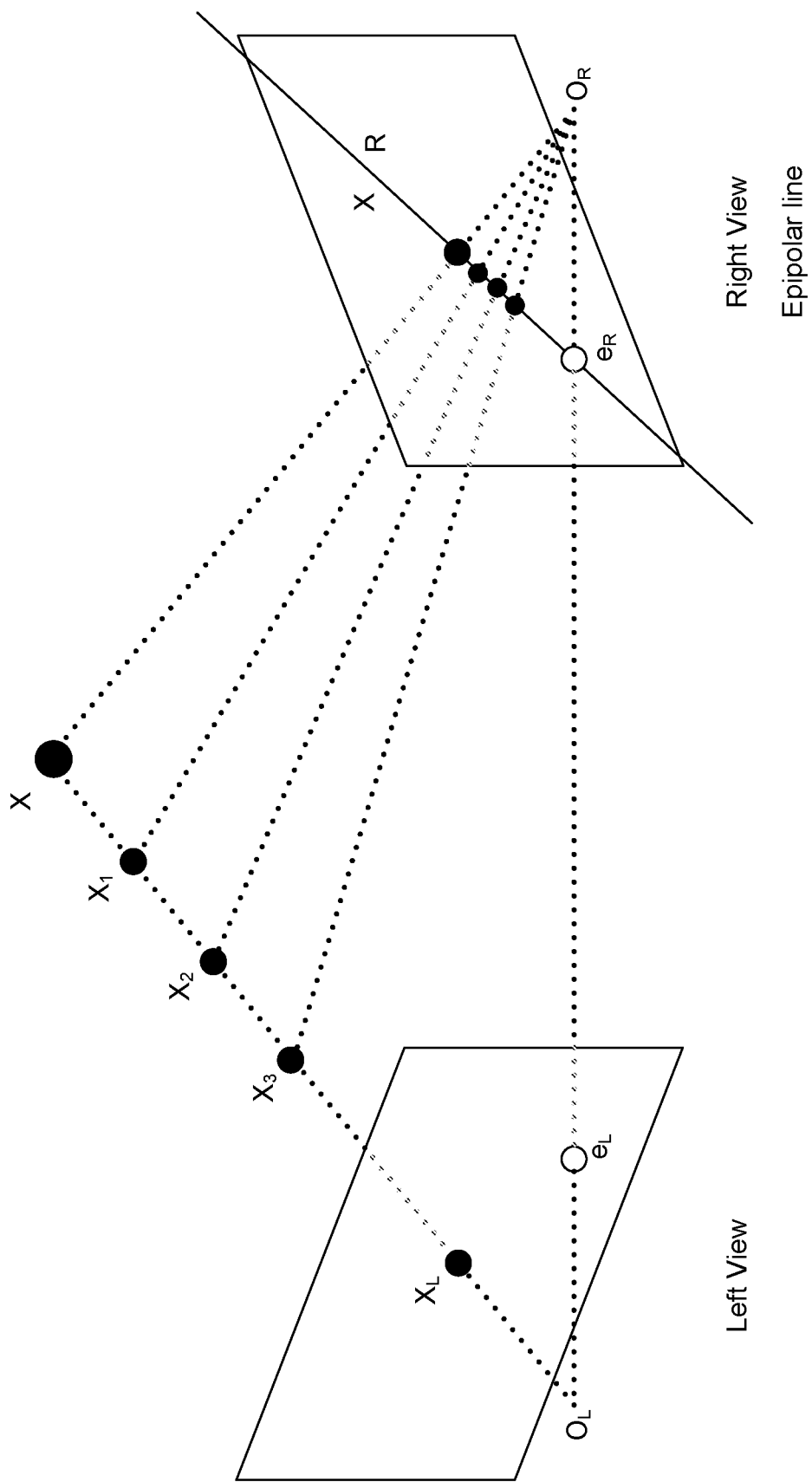
FIG. 1 is a schematic diagram of a stereoscopic view showing an epipolar line according to an embodiment.

FIG. 1 is an illustration or such a stereoscopic image that is used for depth estimation between the left and the right eye. The Epipolar line 100 is provided to provide such depth estimation. Before, these concepts as associated with FIG. 1 and other figures as will be discussed can be fully understood, it may be helpful to define some concepts that will be referenced and used when describing different associated embodiments.

Depth-map estimation—With a light-field camera, a given object in a scene is observed many times with a varying parallax. It is therefore possible to estimate the distance of that object from all cameras. One deduces a so-called depth-map where each pixel quantifies the distance of objects which are visible in the corresponding image acquire by a given camera.

Multi-View plus Depth (MVD)—MVD designates a set of images obtained by the matrix of cameras, plus a corresponding set of depth-map images. One depth-map is associated to one image, it shares the same spatial resolution and same viewing positions.

Point Clouds—a Point cloud is a set of 3D points in the WCS. Each 3D point is associated with a RGB colour. Point clouds can be easily obtained from a MVD, by throwing each RGB pixel into the WCS knowing the camera calibration parameters, and the corresponding depth.

Image View synthesis—Image view synthesis describes an algorithm which permits to compute an image from the scene observed from a position which has not been captured by the matrix of cameras. The extrinsic and intrinsic parameters of the virtual camera can be freely defined, obviously the quality of a synthetized image will be very good if the virtual camera is sharing the same intrinsic parameters than the real cameras, and if it is located not too far to the real cameras.

Camera calibration—Camera calibration is a set of algorithms and special images which are acquired in order to estimate the so-called extrinsic- and intrinsic-parameters. The extrinsic parameters describe the position of the cameras in a real World Coordinate System (WCS): 3 translations to characterize the position of centre of the main-lens pupil, and 3 rotation angles to characterize the orientations of the main optical axis of the cameras. The intrinsic parameters describe the internal properties of each camera such as the focal length, the principal point, the pixel size. It might also include the geometric distortion produced by the main-lens which distorts the captured images compared to an ideal thin lens. Many calibration procedures rely on a checkerboard which is observed many times from various point of views.

Volumetric data—Volumetric data designates an image or video format which permits a user to see a real content from various positions and orientations. A large variety of video or image formats handle volumetric data. There is not yet a common volumetric data format, and it is still an active area of research. To benefit from a volumetric data, a user is using and Head Mounted Display (HMD) which is tracked in space such that the position and orientation of the head controls the position of the virtual camera. By contrast, a 360-degree video produces a partial immersion where only the orientation of the virtual camera can be controls. 360 video are not able to reproduce the parallax variation as captured by a light-field camera. The volumetric data is said 6 DOF (6 degrees of freedom) if the virtual camera can be positioned and oriented freely in space. The volumetric video is said windowed 6 DOF if the virtual camera orientation is limited within a window. Windowed 6 DOF can also being viewed by a single user in front of a conventional screen. The head is being tracked with a webcam to control the position and virtual camera. Lively, the image displayed on screen is computed in real-time from the volumetric data . . . Depth management is an important concept in image processing.

Virtual Color Cube—a "virtual color cube" can also be referred to as MultiPlane Image (MPI).

Normally using any multi-camera capturing system, of N cameras calibration is complex. The N cameras are typically calibrated using for instance a black and white checkerboard which is simultaneously observed by all cameras. Several pictures are taken with the checkerboard positioned at different positions from the cameras. On each picture, the 2D coordinates of the corners delimited by 2 black and 2 white squares of the checkerboard are extracted. From one image, the 2D coordinates of the corners are associated with the 2D coordinates of the same corners observed by the other cameras.

With the N 2D coordinates of corners observed by the N cameras and also for the different exposures, it is possible to estimate the position of the cameras according to a World Coordinate System (WCS). In this system, the centre of the pupil of the main-lens from camera $i \in [1, N]$ is positioned in space by a translation vector $T_i=(X, Y, Z)^t$, and the orientation of the optical axis is defined by a 3D rotation matrix $R_i$. The pose matrix of the camera i is defined by $P_i=(R_i\ T_i) \in \mathbb{R}_{3 \times 4}$. The extrinsic matrix of the camera i is defined by $Q_i=(R_i^{-1} - R_i^{-1} \cdot T_i) \in \mathbb{R}_{3 \times 4}$. The intrinsic camera parameters: focal length; principal point; pixel size; geometrical distortion are estimated simultaneously with the extrinsic camera parameters.

With camera calibration it is possible to convert a 2D pixel coordinate (x, y) from one camera i into a 3D WCS coordinate $(X, Y, Z)^t$ for any distance z between the camera i to the object visible at pixel (x, y). It is also possible from any point in space $(X, Y, Z)^t$ to compute its coordinate observed at pixel (x, y) from camera i.

Returning to FIG. 1, depth estimation is made possible between images observed simultaneously from 2 cameras. Let $x_L(x, y)$ being the pixel from the left camera which observes the object in space X(X, Y, Z). $O_L$ is the optical centre of the left camera. Any object $X_i$ which lies on the line $(O_L, X)$ is observed by the same pixel $x_L$. On the right camera, object $X_i$ are observed at coordinates $x_r$ which all lie on one line on the sensor, referred to as an epipolar line 100. In one embodiment, conventional methods can be used to estimate the depth associated to a pixel is made using the epipolar line. A method according to an embodiments includes one or more of the following A pixel $p_{ref}(x, y)$ of the reference camera is defined at pixel coordinate (x, y).

The pixel $p_{ref}$ is de-projected into the world coordinate system at various distance candidates $Z_c$ with the rotation and translation matrix associated to the reference camera. One gets the physical position of the coordinates candidates $P_{ref}(X_c, Y_c, Z_c)$ which are all observed by the pixel $p_{ref}(x, y)$. The number of candidates S is typically equal to 100 for a good depth estimation. S is also named the number of slices, since they define many planes which cut the 3D spaces in parallel slices where depth-map is estimated.

The candidates $P_{ref}$ are then projected into the second camera according to the extrinsic and intrinsic camera parameters. S coordinates $p_{sec}(x_{z_c}, y_{z_c})$ are deduced on the second camera which all depends on the distance candidate $Z_c$.

The distance $Z_{p_{ref}}$ of the real physical object $P_{ref}$ observed at pixel $p_{ref}$ on the reference camera is equal to the distance candidate $Z_c$ if $p_{ref}(x, y)$ is the most similar to $P_{sec}(x_{z_c}, y_{z_c})$.

The similarity is computed using various estimators. 2 common similarity estimators are listed:

L1 norm between 2 pixels—Let pixel p being observed to be color pixels defined by the 3 scalars corresponding to the 3 colour components Red, Green and Blue $(p_R, p_G, p_B)$. The L1 norm between 2 pixels $p_{ref}(x,y)$ and $n_{sec}(x_{z_c}, y_{z_c})$ is defined by $s_{L1}(p_{ref}(x, y), p_{sec}(x_{z_c}, y_{z_c})) = |p_{ref,R}(x, y) - p_{sec,R}(x_{z_c}, y_{z_c})| + |p_{ref,G}(x, y) - p_{sec,G}(x_{z_c}, y_{z_c})| + |p_{ref,G}(x, y) - p_{sec,G}(x_{z_c}, y_{z_c})|$. From the N candidates $p_{sec}(x_{z_c}, y_{z_c})$, the one having the smallest L1 norm with $p_{ref}(x,y)$ is said to observe to same object in space. The corresponding $Z_c$ is the depth estimation associated to pixel $p_{ref}$.

Squared L2 norm between 2 pixels—Is similar to the previous one expect that the similarity measure is defined by $s_{L2}(p_{ref}, p_{sec}) = \sqrt{|p_{ref,R} - p_{sec,R}|^2 + |p_{ref,G} - p_{sec,G}|^2 + |p_{ref,G} - p_{sec,G}|^2}$ In practice if the similarity is estimated only with the colour component of one pixel, the depth estimation is very sensitive to noise. To overcome this limitation the similarity between 2 pixels is computed using a patch of few surrounding pixels. This technique refers to cross-patch depth-estimation. Obviously, it requires much more computation since it requires $P^2$ more computation for a patch of P×P pixels compared to similarity between 2 pixels. This is a critical point for real-time estimation and especially when embedded into mobile devices. The similarity operator describes above can be used for patches surrounding a pixel.

L1 norm between 2 patches—Let $P_{ref,T}(x, y)$ being a P by P pixels patch surrounding the pixel $p_{ref}(x, y)$ and respectively for patch $P_{sec,T}(x_{z_c}, y_{z_c})$ surrounding pixel $p_{sec}(x_{z_c}, y_{z_c})$. The L1 norm between the 2 patches is defined by $S_{L1}(P_{ref,T}, P_{sec,T}) = \sum_{k=-P/2}^{k=P/2} \sum_{l=-P/2}^{l=P/2} s_{L1}(p_{ref}(x, y), p_{sec}(x_{z_c}-k, y_{z_c}-l))$. From the S candidates $p_{sec}(x_{z_c}, y_{z_c})$, the one having the smallest L1 norm with $p_{ref}(x,y)$ is said to observe to same object in space. The corresponding $Z_c$ is the depth estimation associated to pixel $p_{ref}(x, y)$.

In another embodiment where there is a case of the matrix made of N cameras, for a given camera, N−1 depth-map is estimated. These depth-maps can be merged into a single one (by averaging, taking the closest data . . . ) in order to estimated one depth-map per camera. At the end of this procedure, N images obtained by the N cameras are associated with N depth-maps. As discussed earlier, this data is often referenced as the Multi-View plus Depth (MVD).

In one embodiment using the above concepts can be applied to obtaining a View synthesis. View synthesis denotes the computation of an image from a virtual camera which is located close to the matrix of cameras from which the MVD has been observed/computed. For example, in one embodiment the following technique can be used to obtain a View synthesis.

Figure 10:
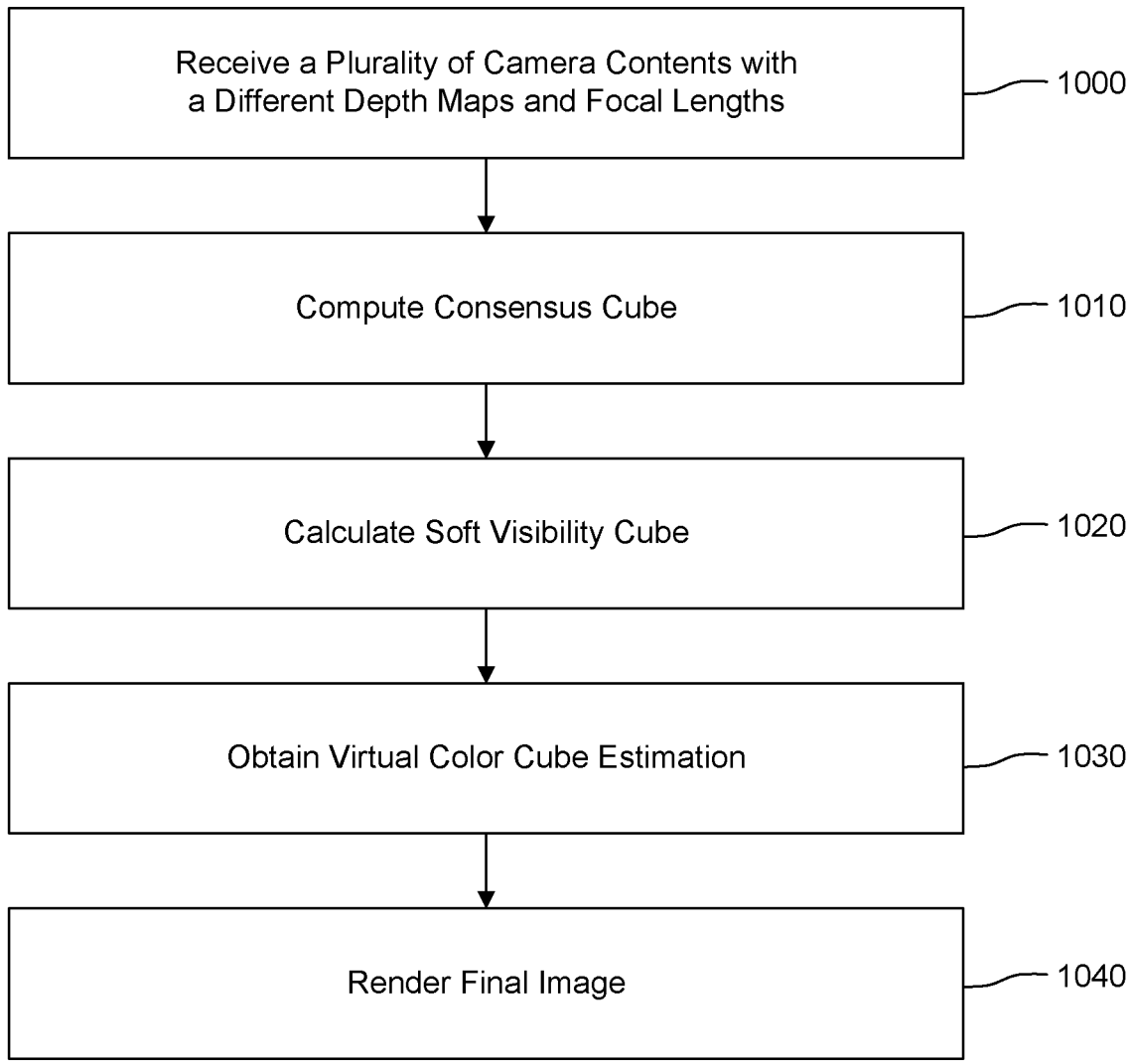
FIG. 10 is a flowchart methodology according to an embodiment.

FIG. 10 provides one embodiment of this synthesis. As indicated in step 1000, when a plurality of contents is received from a camera with a different depth maps and focal lengths, the content that can include one more objects and images are used to first build a consensus cube as in step 1020.

Step 1010—Consensus Cube—With this step, a cube per input image is computed. It quantifies for many sampled depths, how well all the depth-maps match from the viewing point of the selected input camera.

Step 1020—Soft Visibility Cube—This cube is computed by integrating the consensus cube. The soft visibility cube quantifies, for a camera viewing point, how much an object is visible from a given pixel. The visibility is said to be "soft" because the depth-map estimations are error prone. As for the consensus cube, the soft visibility is comparable to a probability.

Step 1030—Virtual Color cube estimation—Knowing the consensus and visibility cubes of the input images, a virtual colour cube is estimated from a virtual camera.

Step 1040—Virtual image computation from the virtual color cube—The virtual colour cube is stacked to form a single virtual image.

Some of these steps are now discussed below in more detail.

In one embodiment, the context of processing a volumetric video content and especially when these contents are represented in a format that is called a virtual color cube as discussed. This virtual color cube is a large amount of data (number of slices times the size of an image). It is prudent to keep only significant pixels of this virtual color cube in a form of tiles which are saved in an atlas of tiles. As is discussed, the way to select which tiles are saved into the atlas using the notion of residual tiles is an important aspect. The virtual color cube is computed based on an array of cameras arranged into a matrix. For instance the images in the technical note come from a matrix of 4 by 4 cameras mounted in a rig of 25 cm by 25 cm. How the depth-maps, the consensus cube, the virtual color cube are computed or converted into an atlas of tiles is not in the scope of the invention.

Figure 4:
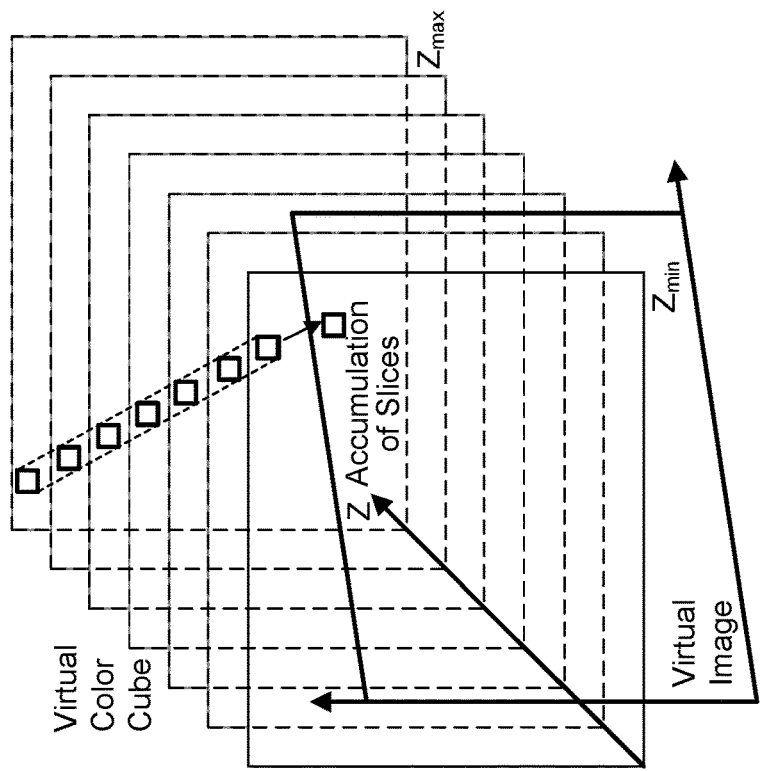
FIG. 4 illustrates merging of a virtual color cube into a virtual image
Figure 4:
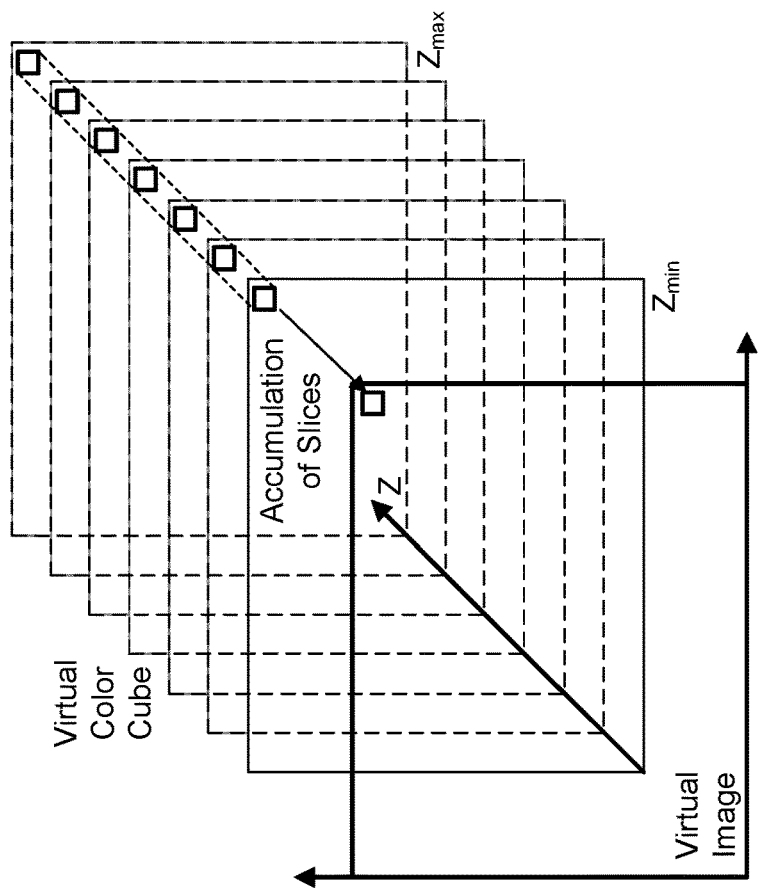

The purpose of the virtual color cube or its atlas version, is to compute a virtual view of the scene as seen for a virtual camera which lies close to the real cameras which have been used to capture the scene. It consists in stacking the virtual color cube into a single image as illustrated in FIG. 4 of the technical note.

1. Consensus computation—The consensus denotes how well the depth-maps agrees with one given depth-map. For each input image $I_i$ made of $(N_x, N_y)$ pixels and its corresponding depth-map $D_i$, a consensus cube $C_i$ is computed. The cube $C_i$ is made of $(N_x, N_y, S)$ pixels where S denotes the number of slices. Each slice $s \in [1, S]$ is associated to a distance z which varies inversely proportional from $z_{min}$ and $z_{max}$. The minimum and maximum distances are defines depending on the scene content, it is typically set to the same minimum and maximum distances used to compute the depth-maps.

To define the consensus cube, the pulse function $\Pi(a, b, c)$ is defined such that:

$$\Pi(a, b, c) = \begin{cases} 0 & \text{if } a < b - c/2 \\ 1 & \text{if } b - c/2 < z < b + c/2 \\ 0 & \text{if } a > b + c/2 \end{cases} \quad (1)$$

Also the Heaviside H(a, b) function is defined as follow:

$$H(a, b) = \begin{cases} 0 & \text{if } a < b \\ 1 & \text{if } a \geq b \end{cases} \quad (2)$$

The value of the consensus at pixel (x, y) for the camera i at the slice s associated to the distance $z=D_i(x, y)$ is equal to:

$$C_i(x, y, s) = \frac{\sum_{k \in M} \Pi\{z, D_k(x'_k, y'_k), \Delta_z\}}{\sum_{k \in M} H\{z, D_k(x'_k, y'_k)\}} \quad (3)$$

Where M is the set of cameras which are used to compute the consensus of camera i. For a precise computation, M is chosen equal to all cameras except camera i. $D_k(X'_k, y'_k)$ is the distance given by the depth-map associated with camera k at pixel coordinate $(x'_k, y'_k)$. $(x'_k, y'_k)$ coordinate is computed by: 1/de-projecting the pixel coordinate (x, y) from camera i into the WCS at (X, Y, Z) knowing $z=D_i(x,y)$; and 2/by projection the WCS at (X, Y, Z) into camera k at coordinate $(x'_k, y'_k)$. Projection and de-projection are computed with the intrinsic and extrinsic camera parameters.

The consensus is defined as the ratio between the numbers of cameras which agrees that an object is distant to the camera by $z=D_i(x,y)$ divided by the total number of cameras which can still see beyond distance z from the camera. The computation of the consensus $C_i$ is noisy especially when most of the images are occulted beyond a certain distance. In this case, the denominator of equation (3) tends to zero. One option is to set a minimum value for the denominator. This minimum value is experimentally set to N'/4 where N' is the number of cameras sharing almost the field of view. The consensus $C_i$ can be smoothed in order to improve its signal to noise. Denoising is performed slice per slice by so-called guided denoising algorithms. A local smoothing kernel is computed with surrounding pixels around $C_i(x, y, s)$ from the concensus at slice s and around pixels from the observed image $I_i(x, y)$.

Soft Visibility computation—Soft Visibility is computed for a given image $I_i$ by integrating its consensus $C_i$ trough slices according to the following equation:

$$SofVis_i(x, y, z) = \max\left(0, 1 - \sum_{z'=z_{min}}^{z'=z} C_i(x, y, z')\right) \quad (4)$$

The visibility is equal to 1 for the first slice, and decrease until 0. When the visibility is decreasing toward 0, this means that beyond a given slice, the image $I_i$ is occulted by an object visible at pixel $I_i(x,y)$. The max( ) in equation (4) prevents the visibility to decrease bellow 0. This occurs frequently because the consensus is the agreement between all cameras which are able to see beyond occulted objects from the view i. Potentially the $$\sum_{z'=z_{min}}^{z'=z_{max}} C_i(x, y, z')$$

can be equal to M the number of cameras used to compute $C_i$.

Virtual Color cube estimation—The estimation of a virtual image seen from a virtual camera position is computed with a set of M' observed images $I_k$ such that $k \in M'$. The set M' can be defined as simply as the 4 real cameras closest to the virtual camera. To estimate a virtual image seen from a virtual camera position, a virtual colour cube $Color_{synth}(x, y, z)$ is preliminary computed. The colour cube is in the coordinate system of the virtual camera which is characterized with intrinsic and extrinsic camera parameters. Each slice of this virtual cube is computed as an average of the M' images weighted by the corresponding soft visibility.

$$Color_{synth}(x, y, z) = \frac{\sum_{k \in M'} SoftVis_k(x'_k, y'_k, z'_k) I_k(x'_k, y'_k)}{\sum_{k \in M'} SoftVis_k(x'_k, y'_k, z'_k)} \quad (5)$$

Similarly from equation (3), $(x'_k, y'_k, z'_k)$ denotes the re-projected coordinate (x, y, z) from the virtual camera to the real camera k. The great advantage of this approach, is that the integer coordinate (x, y, s) from the virtual color cube are computed with a backward warping approach which is made possible thanks to the sampling of z by the cube. The virtual colour cube is similar to a focal-stack where only objects lying at the given slice are visible, the foreground objects have been removed.

Virtual image computation by staking the virtual Color cube—The virtual colour cube is merged to form a unique virtual colour image. It is first required to compute the consensus cube $Consensus_{synth}(x, y, z)$ and the visibility cube $SoftVis_{synth}(x, y, z)$ associated with the colour virtual images. Similarly to equation (5) the computation is done by averaging the M' initial consensus or visibility cube:

$$Consensus_{synth}(x, y, z) = \sum_{k \in M'} C_k(x'_k, y'_k, z'_k) \quad (6)$$

$$SoftVis_{synth}(x, y, z) = \sum_{k \in M'} SoftVis_k(x'_k, y'_k, z'_k) \quad (7)$$

Both cubes defined above are combined into CC(x, y, z)

$$CC(x,y,z) = \min(Consensus_{synth}(x,y,z), SoftVis_{synth}(x,y,z)) \quad (8)$$

Virtual Color cube estimation The CC is a kind of probability which varies between 0 to 1. The typical values are:

- If a given CC(x, y, z) is equal to 1, this means that all cameras agrees that an object is lying at the distance z from the virtual camera, and is seen at the coordinate (x, y) within the virtual camera.
- A high value CC>50% is rare it corresponds to object where the depth estimation was accurate (textured areas) and positioned exactly on a slice of the virtual cameras and quite close to the slices of the real cameras.
- CC values are mostly equal to 0 since many slices do not match any object.
- For objects with few details, the depth-maps extracted from the raw images does not agree and the raw consensus is low, it can be as low as 1/N where N is the number of cameras. In this case the CC is also low with values around 1/N.
- CC values can be lower than 1/N for objects which lie between 2 slices. So CC values equal to few percent are common.

The colour slices are then weighted by consensus and accumulated until ray visibility reaches zero:

$$I_{synth}(x, y) = \frac{\sum_{z=z_{min}}^{z=z_{max}} Color_{synth}(x, y, z) CC(x, y, z)}{\sum_{z=z_{min}}^{z=z_{max}} CC(x, y, z)} \quad (9)$$

Figure 2:
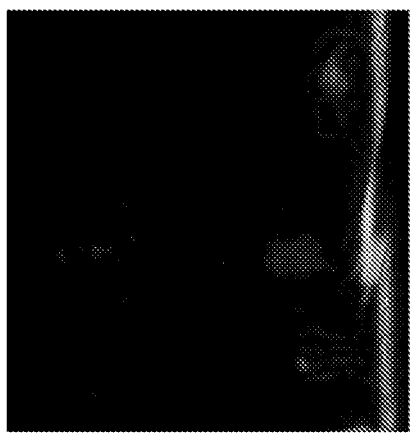
FIG. 2 is an illustration of different consecutive slices of a virtual color cube according to an embodiment.
Figure 2:
Figure 2:
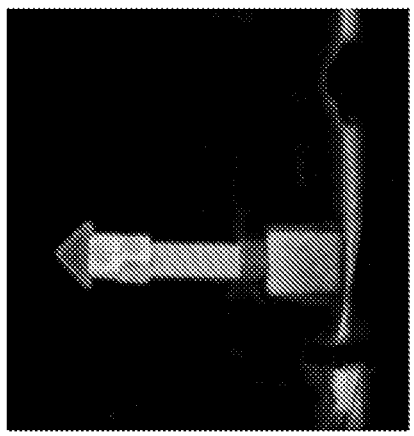
Figure 2:
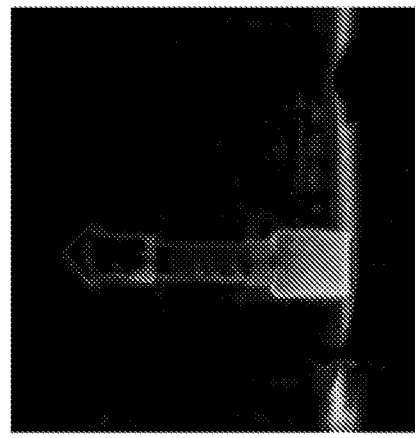
Figure 2:
Figure 2:

In practice, the virtual colour cube is saved with pixels made of 4 values: Red, Green, Blue and Alpha (RGBA). The RGB encodes the colour as computed by equation (5). The alpha encodes the CC (x, y, z) component has computed by equation (8). FIG. 2 illustrates the algorithm applied on images captured with a matrix of 4×4 cameras. 4 consensus and visibility cubes are computed with 128 slices for the 4 central cameras. All depth-maps are contributing to compute the consensus and visibility cubes: the set M is made of 15 cameras. The synthetic colour cube is computed with the 4 central cameras: the set M' is made of 4 cameras FIG. 2 illustrates a detailed view of the 4 original images (4 images on the left), and the synthetized image (right image).

Figure 3:
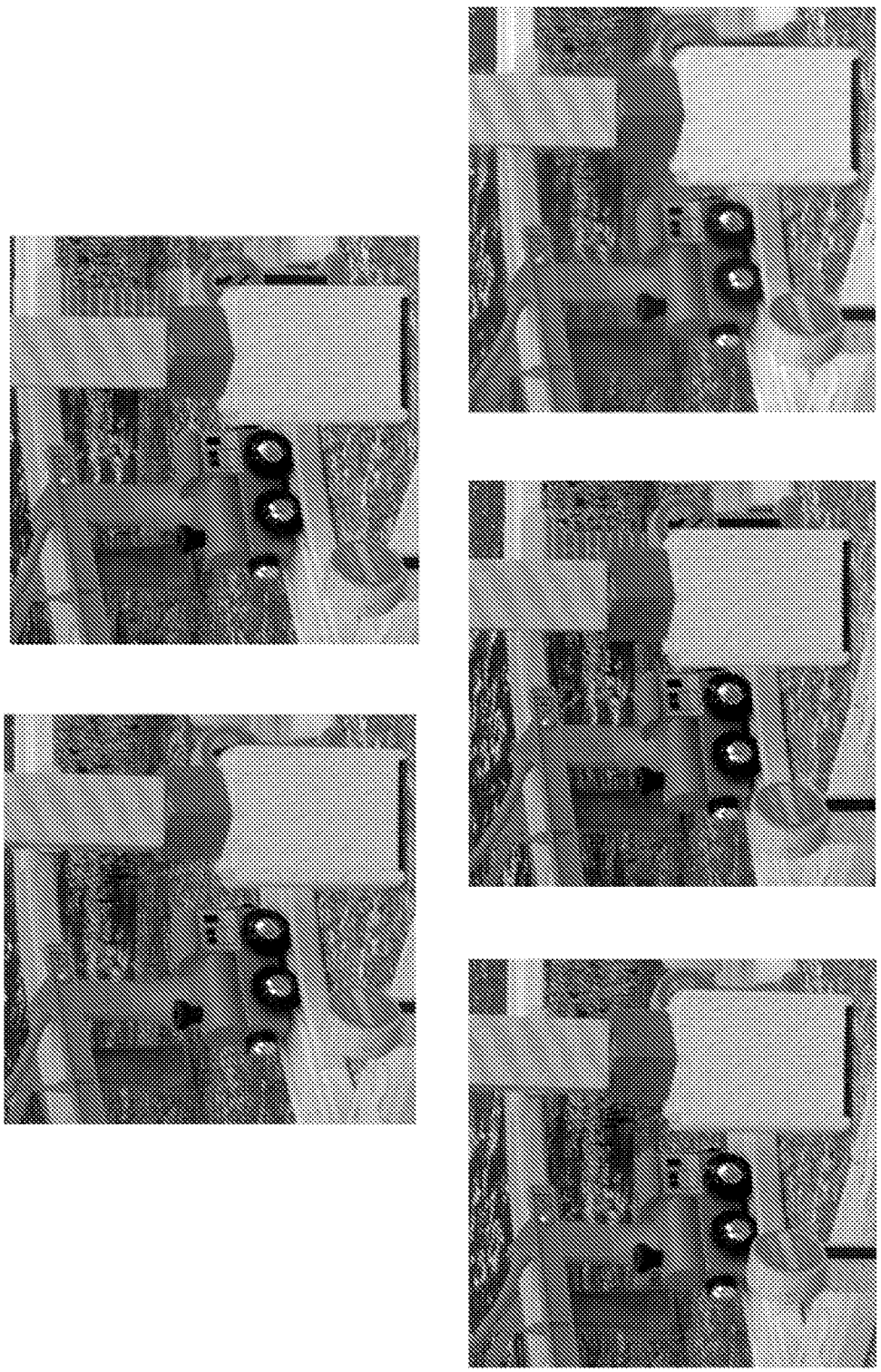
FIG. 3 is an illustration showing one application of a synthesis algorithm according to one embodiment.

In one embodiment as provided in FIG. 3 more accurate results are provided with scenes made of complex occlusions. It requires a large amount of memory for the M' consensus and visibility cubes. Decreasing the memory occupation can be performed by applied the complete process slice per slice. But care must be taken since a slice of the virtual colour cube will intersect several slices of the consensus and visibility cubes associated to the original images. Slice per slice computation is not feasible for matrix of cameras where cameras are not roughly located on the same plane and pointing to the same orientation.

A matrix of 4×4 cameras made of 2MPix each; 200 slices to compute the depth-map consensus & visibility cubes; the computation of one synthetic image is performed in 5 seconds on a GPU and requires 8 Gb of memory.

During the final step of the view synthesis algorithm, the virtual colour cube is merged into a single virtual image according to some weights. The left part illustrates how the merging is done per 2D coordinates. This step is straight forward and is compatible with real-time rendering. Actually, most of computation time is dedicated for the 3 first steps of the algorithm.

With a virtual colour cube defined for a given virtual camera position, it is possible to approximate any other virtual views. The strategy is to merge the virtual colour cube with any "second" projections as illustrated in the right. The second projection controls the viewing-point and camera position of the second virtual camera of the final synthetized image. Accordingly, 2 virtual cameras positions are defined, the first one $P_c$ is dedicated to compute the virtual colour cube, and the second one $P_i$ is dedicated to merge the virtual colour cube into a freely selected virtual camera position. In practice, the virtual camera $P_c$ is located at the middle of the real cameras, the virtual camera $P_i$ is controlled by the head position of a user for an immersive experience.

The equation (10) is modified by the projection of the 3D coordinate (x, y, z) with the 4×4 projection matrix $P_i$:

$$I_{synth}(x, y) = \frac{\sum_{z=z_{min}}^{z=z_{max}} Color_{synth}(x_p, y_p, z_p) CC(x_p, y_p, z_p)}{\sum_{z=z_{min}}^{z=z_{max}} CC(x_p, y_p, z_p)} \quad (10)$$

Where $[x_p, y_p, z_p, 1] = P_i \times [x, y, z, 1]$. The projected coordinate $(x_p, y_p, z_p)$ being non-integer, value $Color_{synth}(x_p, y_p, z_p)$ are estimated by interpolation.

The equation (10) is modified by the pro Merging the virtual colour cube with a slanted projection produces a virtual image with slightly lower quality than the complete algorithm computed for $P_c$. This is shown in FIG. 4. In FIG. 4, the left rendition 402 provides for a virtual image sharing the same virtual camera position as the virtual color cube. The right rendition, 404 provides the image freely computed from the virtual color cube. Nevertheless, this embodiment permits to split the computation of the 3 first steps of the algorithm, until the computation of the virtual color cube, from the stacking of that cube into the virtual image. The real-time rendering is therefore possible with recorded content and some precomputation up to the virtual color cube.

Next the topic of obtaining an optimized real-time rendering, toward a new volumetric data format can be explored. The virtual colour cube is by nature large. For instance with a camera rig of 4×4 cameras of 2048×1088 pixel each, the virtual colour cube is typically made of 128×2048×1088 pixels for 128 slices. The virtual colour cube is also full of zeros since most of the slices in the cube do not match with a detail in the scene, with real content one notes that 90% of the pixels are null or with a negligible contribution: CC(x, y, z)<10%. Stacking the colour cube as illustrated is computed at 4 Hz with recent GPU cards. To speed-up by a factor of 10 the virtual colour cube is converted into a new structure with no or few null pixels. A basic approach is to split the virtual colour cube into tiles $T_i$ of fix size $[T_x, T_y]$. This is provided in FIG. 5.

Figure 5:
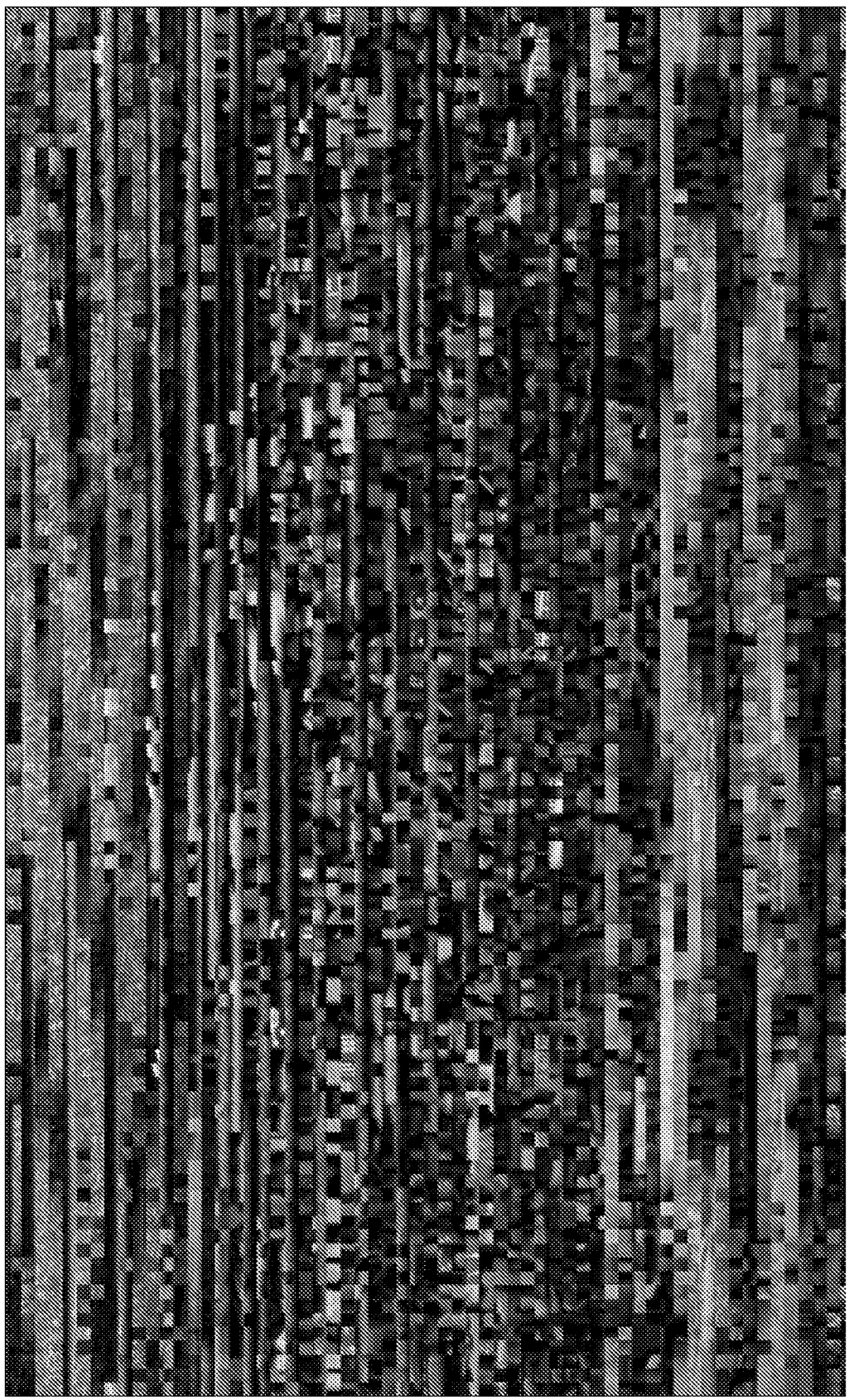
FIG. 5 is an illustration of tiling of a virtual color cube according to an embodiment.

In FIG. 5, the Tiling of the virtual color cube is shown such that all tiles are saved into a 2D images. Choosing all tiles with the same size makes the splitting of the virtual colour cube easier. This is converted into single 2D image where only the significant tiles are saved. The components are saved per pixel, the RGB colour component plus the alpha (A) component which indicates the CC values as described by equation (8). The collection of significant tiles is named atlas. A tile $T_i$ is characterized by a small image made of $[T_x, T_y]$ pixels and a 3D position within the virtual colour cube $(x_i, y_i, s_i)$ where $s_i$ is the slice from which the tile has been extracted between pixel coordinates $(x_i, y_i)$ and $(x_i+T_x, y_i+T_y)$. The $[T_x, T_y]$ pixels of a tile are saved into a 2D image as shown. Also an index describing the tile positions within the virtual colour cube $(x_i, y_i, s_i)$ is also created. The Atlas is made of a 2D image and the corresponding index, it represents a subset of the complete virtual colour cube.

The next topic that requires exploring is the selection process of the tiles. The main issue here is the challenge of creating an atlas is to characterize how significant is a tile to decide if it is saved into the atlas or discarded. A trivial approach has been implemented: a tile $T_i$ is significant if at least one pixel has a CC component greater than $CC_s$ a threshold coefficient. If $CC_s$ is set to 0.0, all tiles with at least one pixel with non-null CC are saved.

Figure 6:
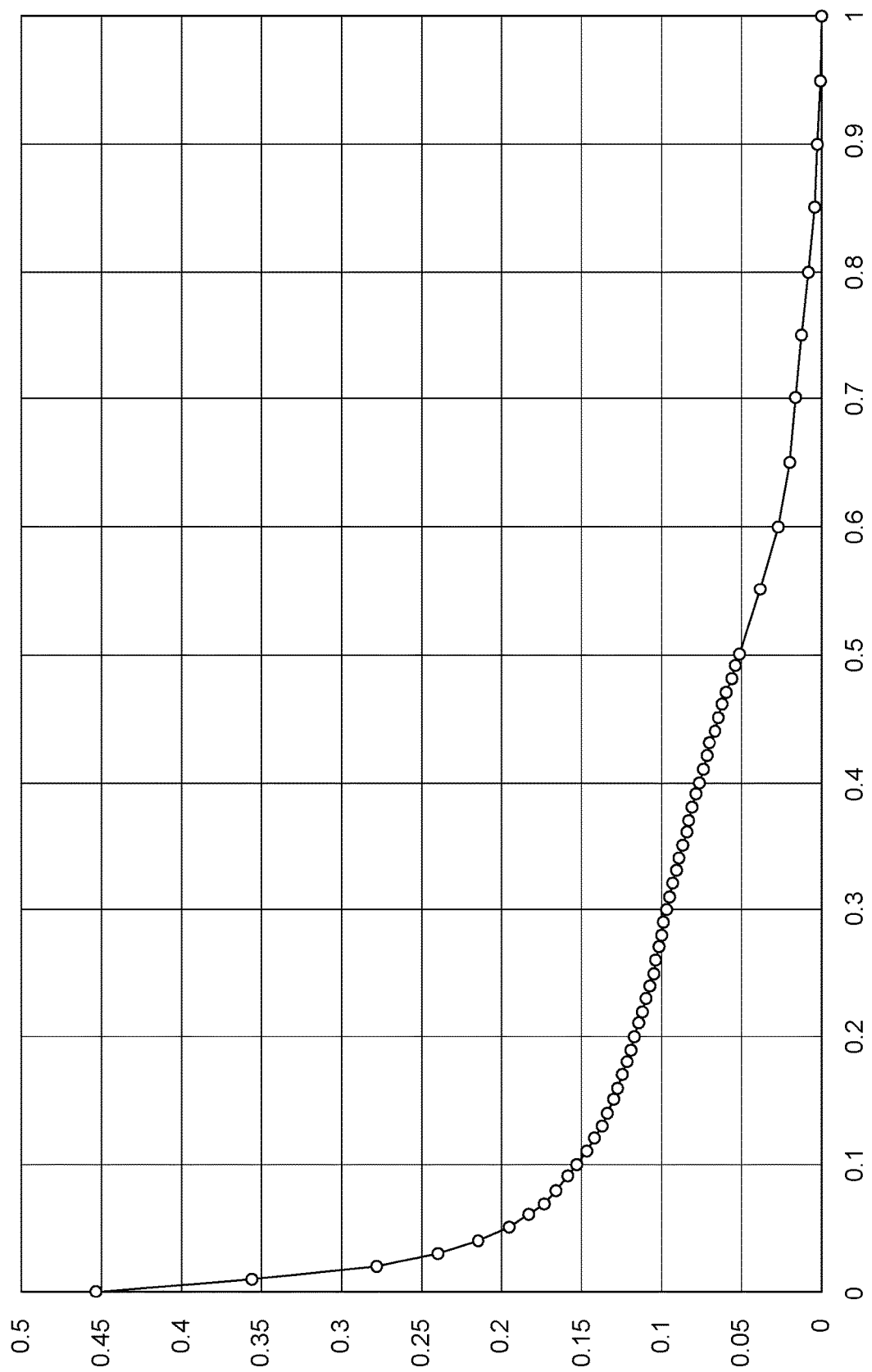
FIG. 6 is a graphic illustration of consensus values according to an embodiment.

FIG. 6 illustrates the ratio of significant tiles versus the threshold coefficient $CC_s$. The measurement conditions are: rig of N=16 cameras with image 2048×1088 pixels; depth-maps computed for 200 slices; tiles are [32,32] pixels; the scene the so-called "toy-train". The fraction of significant tiles defines a compression ratio. $C_r$ is the number of significant tiles divided by the total number of tiles within the virtual colour cube. Obviously, the image quality of the virtual image degrades with the compression ratio $C_r$.

All tiles with non-null pixels represents 45% of all tiles.

One wishes to have a compression ratio of 15% such that one atlas has the size of 64 MB which is comparable to the size of the Multi View Data (MVD) when keeping the raw data (one unsigned char value per pixel) and the depth-maps (one unsigned char per pixel). This compression ratio is obtained with $CC_s=0.1$. The image quality is acceptable with reasonable degradation.

With a compression ratio of 15% the computation time of a virtual image from the atlas is done with a framerate larger than 30 Hz. This framerate makes the real time computation possible by controlling the virtual camera position with head tracking.

Figure 7:
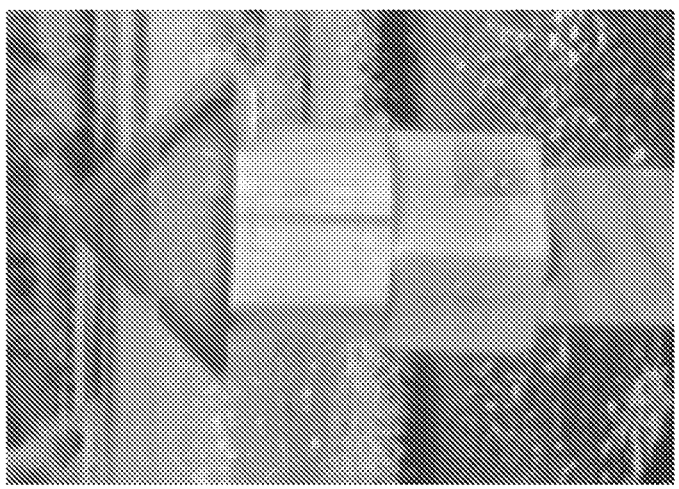
FIG. 7 is an illustration of different threshold values for virtual images according to one embodiment.
Figure 7:
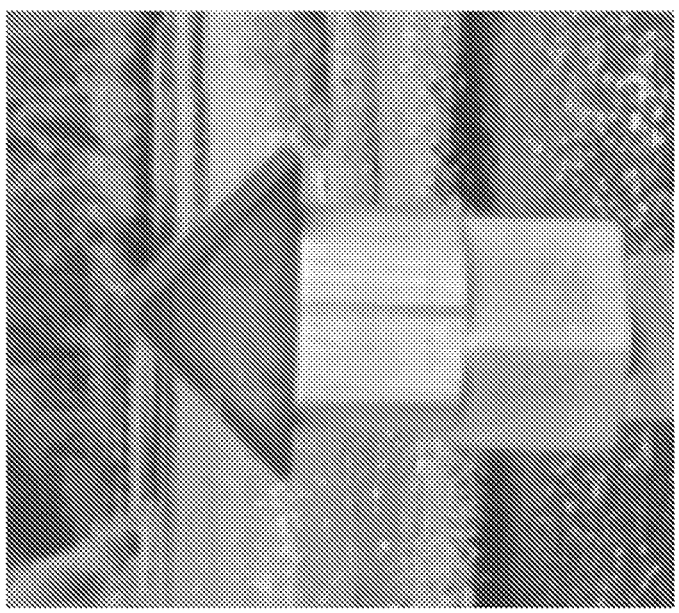
Figure 7:
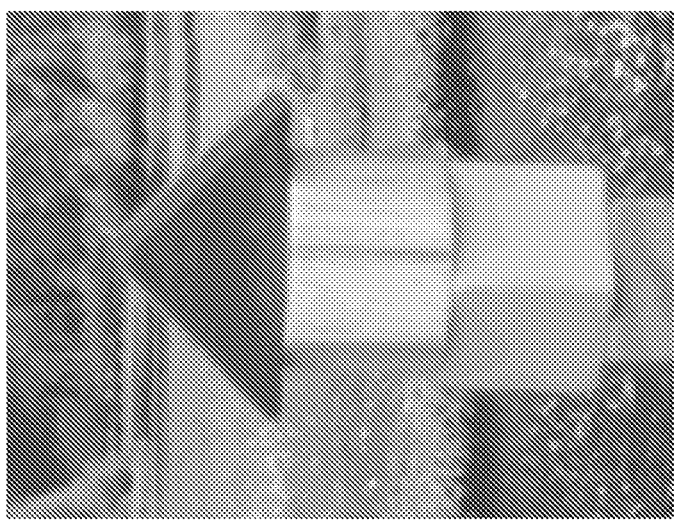
Figure 8:
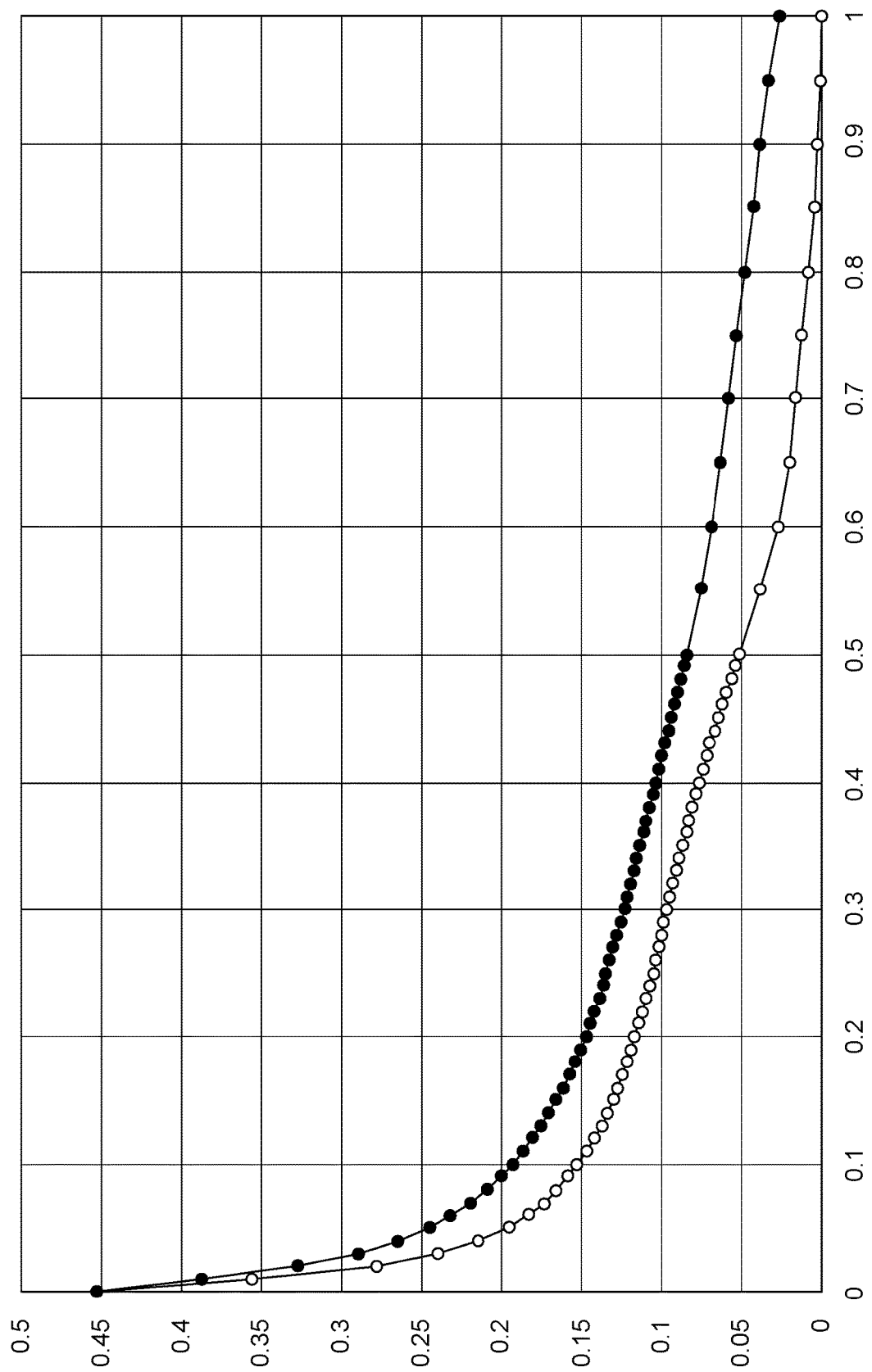
FIG. 8 is an illustration of a table providing multi-view acquisition information

The impact of this on image quality can be understood with respect to FIG. 7. In FIG. 7, the FIG. 1—virtual image computed with various threshold values is as follows ration wise: A/$CC_s=0$; B/$CC_s=0.17$ and $C_r=12\%$; D/$CC_s=0.3$ and $C_r=9.7\%$. This allows tile selection with respect to image quality. The main visible impact is that the objects appear with transparencies, especially on poorly textured areas where depth-map estimation is less robust. In FIG. 7, the FIG. 1 illustrates virtual images with 3 distinct settings: 1/the virtual image when no tiles selection is performed; 2/a tiles selection of $CC_s=0.17$ is applied, it corresponds to a compression ratio $C_r=12\%$, and finally 3/a tiles selection of $CC_s=0.3$ and a compression ratio $C_r=9.7\%$. The loose of tiles makes foreground objects with no texture to appear partially transparent. Indeed, for these objects, the depth-map are not accurate, thus the consensus is poor, and the CC coefficient is also low. The discarded tiles are missing to remove the transparency. The proposed solution bring an innovative approach to cancel this effect.

In one embodiment, selecting the tiles to reduce (lightweight) the size of the atlas describing the virtual colour cube of a scene makes foreground objects to appear partially transparent may provide an optimal solution. To address the issue, in one embodiment, the solution may be to keep the unselected tiles into a residual images. Such a method includes one or more of the following steps 1. The virtual colour cube is computed.
2. A residual image having the size of the raw image is set to 0.
3. The tiles are analysed from the first slice closer to the camera at $z_{min}$ to the last slice corresponding to $z_{max}$.
4. The slice s is split into tiles of [$T_x$, $T_y$] pixels, a tile is at the coordinate ($t_x$, $t_y$) from the grid of tiles. It corresponds to the pixel coordinates ($t_x T_x$, $t_y T_y$, s) of the virtual colour cube. Each tile $T_i$ is analysed individually.
5. The content of the tile $T_i$ is equal to the pixels of the virtual colour cube located between ($t_x T_x$, $t_y T_y$, s) and ($t_x T_x + T_x$, $t_y T_y + T_y$, s) plus the pixel of the residual image located between ($t_x T_x$, $t_y T_y$) and ($t_x T_x + T_x, t_y T_y + T_y$). The tile being analysed is equal to the pixel of the virtual colour cube if the residual is null.
6. If at least one pixel within the tile $T_i$ has a CC value larger than $CC_s$ then the tile is saved into the atlas. The corresponding pixels on the residual image are set to 0. Else the tile $T_i$ is saved into the residual image, replacing the previous pixel values;

The last three steps (4, 5, and 6), can then be reiterated as until all slices and tiles are parsed. This illustrates the ratio $C_r$ of tiles which are kept versus the threshold coefficient $CC_s$. It may be noted that even for a threshold coefficient $CC_s=1$ the residual method is able to keep some tiles since they will be accumulated until they reach CC=1.

Figure 9:
FIG. 9 is a graphic illustration of fractions of significant tiles according to an embodiment.
Figure 9:
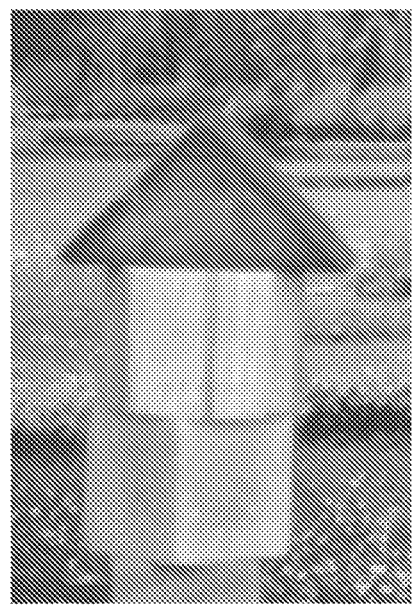
Figure 9:
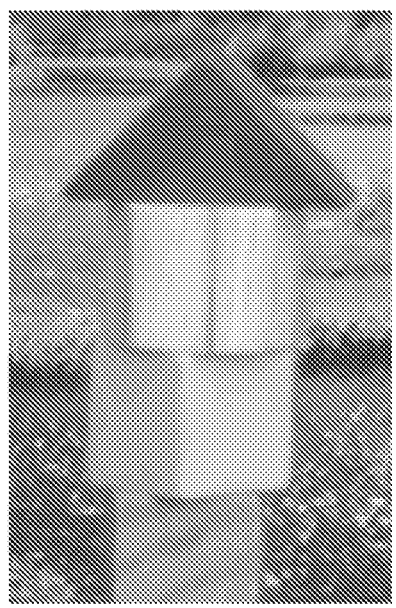
Figure 9:
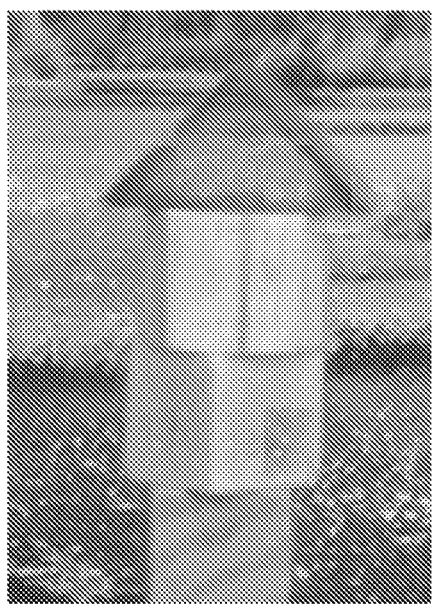

FIG. 9 compares the portion of the virtual image computed from atlases for 2 different compression ratios in case of the common and proposed method. It may be noted that for the same compression ratio, the virtual image computed with the proposed method is showing almost no transparency around the red object. The virtual image computed with the residual tiles is almost identical to the virtual image computed with all the tiles (see In FIG. 7, the FIG. 1-A).

Figure 11:
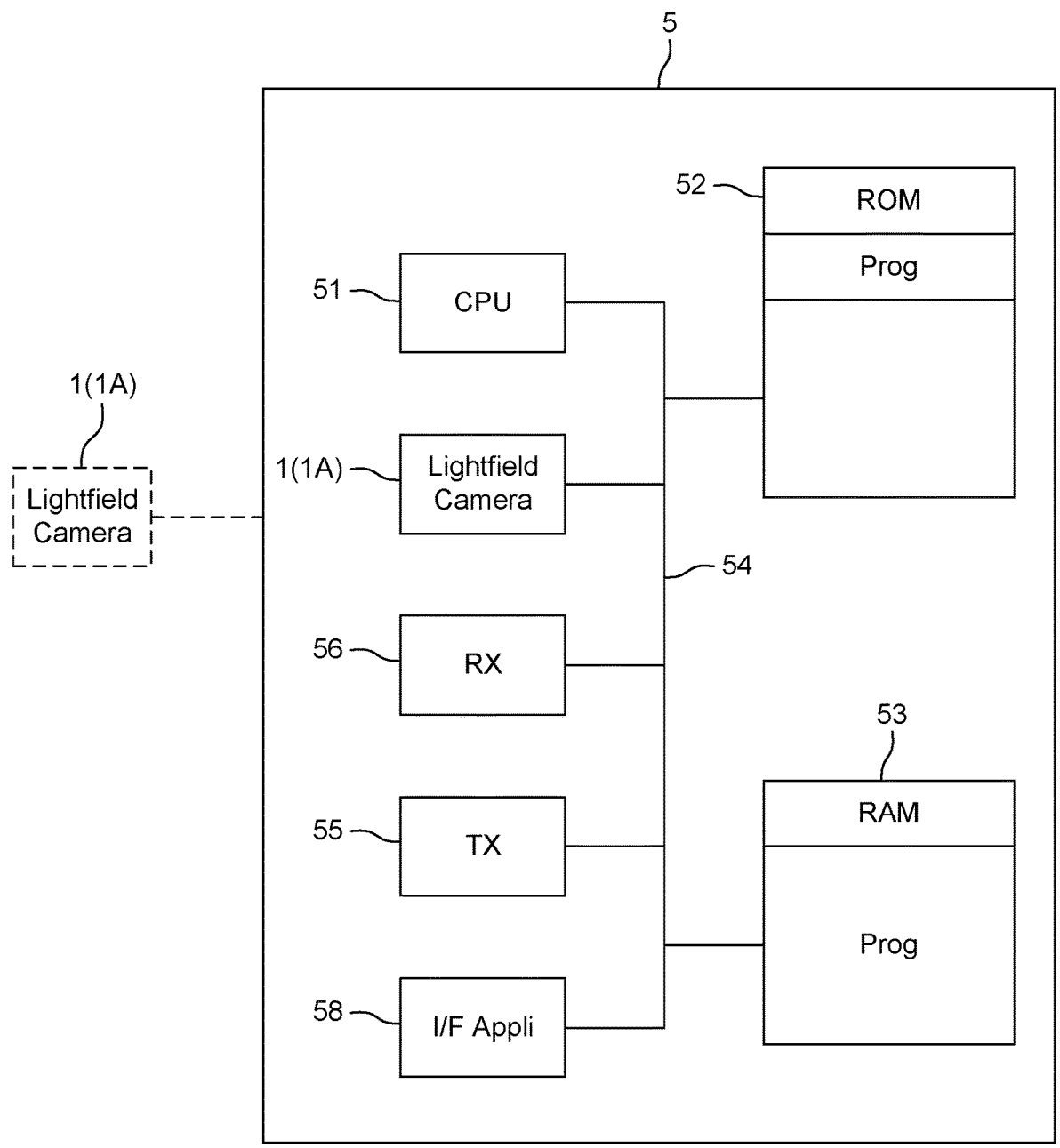
FIG. 11 is a block diagram of a device in which one or more embodiments may be implemented.

FIG. 11 is a diagram illustrating a device which in which one or more embodiments of present disclosure may be implemented. Although it is depicted in FIG. 11 that a device 5 includes a camera 1, such as a lightfield camera 1 (or 1A that will be explained in later section of this description), a lightfield camera 1 can be configured separately from a device 5. A device 5 can be any device such as, for example, desktop or personal computers, smartphones, smartwatches, tablets, mobile phones, portable/personal digital assistants ("PDAs"), and other devices that facilitate communication of information between end-users and a lightfield camera 1. Lightfield camera 1 can also have equivalent hardware configuration of a device 5 inside.

The device 5 comprises the following elements, which are connected to each other by a bus 54 of addresses and data that also transports a clock signal: a processor 51 (or CPU), a non-volatile memory of ROM (Read Only Memory) type 52, a Random Access Memory or RAM 53, a radio interface (RX) 56, an interface 55 (TX) adapted for the transmission of data, a lightfield camera 1, an MMI (Man Machine Interface) 58 (I/F appli) adapted for displaying information for a user and/or inputting data or parameters.

It is noted that the term "register" or "store" used in the description of memories 52 and 53 designates in each of the memories mentioned, a memory zone of a low capacity as well as a memory zone of a large capacity (enabling a whole program to be stored in such memories or all or part of the data representing data received and decoded for such memories).

The ROM 52 comprises a program "prog". The algorithms implementing one or more steps of the method of embodiments of the present disclosure and described below are stored in the ROM 52 memory and are associated with the device 5 implementing these steps. When powered up, the processor 51 loads and runs the instructions of these algorithms. RAM 53 comprises in a register and/or memory, the operating program of the processor 51 responsible for switching on the device 5, reception parameters (for example parameters for modulation, encoding, MIMO (Multiple Input Multiple Output), recurrence of frames), transmission parameters (for example parameters for modulation, encoding, MIMO, recurrence of frames), incoming data corresponding to the data received and decoded by the radio interface 56, decoded data formed to be transmitted at the interface to the application 58, parameters of the primary lens 10 and/or information representative of the centers of the micro-images formed by the microlenses of the microlens array. Other structures of the device 5, than those described with respect to FIG. 11, are compatible with the present disclosure. In particular, according to various alternative embodiments, the device 5 may be implemented according to a purely hardware realization, for example in the form of a dedicated component (for example in an ASIC (Application Specific Integrated Circuit) or FPGA (Field-Programmable Gate Array) or VLSI (Very Large Scale Integration) or of several electronic components embedded in an apparatus or even in a form of a mix of hardware elements and software elements. The radio interface 56 and the interface 55 are adapted for the reception and transmission of signals according to one or several telecommunication standards such as IEEE 802.11 (Wi-Fi), standards compliant with the IMT-2000 specifications (also called 3G), with 3GPP LTE (also called 4G), IEEE 802.15.1 (also called Bluetooth). According to an alternative embodiment, the device 5 does not include any ROM but only RAM where the algorithms implementing the steps of the method specific to the present disclosure are stored in the RAM.

One or more features of embodiments may be implemented in software, in hardware or in a combination thereof. One or more steps of methods according to the invention may be implemented by a processor. An embodiment relates to computer program product comprising instructions which when executed by a processor cause the processor to perform the one or more steps of a method of any of the embodiments.

Although the present embodiments have been described hereinabove with reference to specific embodiments, the present disclosure is not limited to the specific embodiments, and modifications will be apparent to a skilled person in the art which lie within the scope of the claims.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate

The invention claimed is:

1. A method comprising:
    obtaining a virtual color cube representing a volumetric scene from the point of view of a virtual camera, the virtual color cube comprising slices of the volumetric scene at different depths, each slice encoding a 2D array of pixels, wherein each pixel in each slice comprises a color specification and an alpha value;
    partitioning each slice of the virtual color cube into tiles, each tile comprising a rectangular subset of the pixels of the slice; and
    constructing an atlas of significant tiles, wherein constructing the atlas further comprises storing the pixels of an excluded tile in a residual image at a position corresponding to the position occupied by the tile in its original slice of the virtual color cube.

2. The method of claim 1, further comprising for each tile in each slice of the virtual color cube, comparing the alpha values associated with the pixels of the tile to a threshold alpha value.

3. The method of claim 2, further comprising comparing and then determining based on said comparison when each tile is to be included or excluded in the atlas of significant tiles.

4. The method of claim 3, wherein constructing the atlas further comprises:
    when processing a subsequent slice of the virtual color cube, adding the stored pixels of the excluded tile to the pixels of a corresponding tile of the subsequent slice to produce modified pixels, and
    using the modified pixels when performing the comparing, determining, including and excluding steps of constructing the atlas for the corresponding tile.

5. The method of claim 1, wherein constructing the atlas further comprises processing the slices of the virtual color cube in order of their depth values.

6. The method of claim 1, wherein the color specification comprises R, G, and B color values.

7. The method of claim 1, wherein the alpha value for a pixel reflects a confidence that the pixel represents a portion of the volumetric scene accurately positioned at the depth corresponding to the slice in which the pixel resides.

8. The method of claim 1, wherein the alpha value for a pixel represents a probability.

9. The method of claim 1, wherein the alpha value for a pixel is a value in the range from 0 to 1.

10. The method of claim 1, wherein the alpha value for a pixel reflects the degree to which multiple cameras capturing the scene agree that a surface of an object exists at the pixel position within the slice.

11. The method of claim 1, wherein each slice of the virtual color cube is partitioned using the same pattern of tiles.

12. An apparatus comprising:
    a processor configured to:
        obtain a virtual color cube representing a volumetric scene from the point of view of a virtual camera, the virtual color cube comprising slices of the volumetric scene at different depths, each slice encoding a 2D array of pixels, wherein each pixel in each slice comprises a color specification and an alpha value;
        partition each slice of the virtual color cube into tiles, each tile comprising a rectangular subset of the pixels of the slice; and
        construct an atlas of significant tiles, comprising storing the pixels of an excluded tile in a residual image at a position corresponding to the position occupied by the tile in its original slice of the virtual color cube.

13. The apparatus of claim 12, wherein the processor is further configured to, for each tile in each slice of the virtual color cube, compare the alpha values associated with the pixels of the tile to a threshold alpha value.

14. The apparatus of claim 13, wherein the processor is further configured to compare and determine based on said comparison when each tile is to be included or excluded in the atlas of significant tiles.

15. The apparatus of claim 13, wherein the processor is further configured to:
    when processing a subsequent slice of the virtual color cube, add the stored pixels of the excluded tile to the pixels of a corresponding tile of the subsequent slice to produce modified pixels; and
    use the modified pixels when performing the comparing, determining, including and excluding steps of constructing the atlas for the corresponding tile.

16. The apparatus of claim 12, wherein the processor is further configured to:
    process the slices of the virtual color cube in order of their depth values.

17. The apparatus of claim 12, wherein the color specification comprises R, G, and B color values.

18. The apparatus of claim 12, wherein the alpha value for a pixel reflects a confidence that the pixel represents a portion of the volumetric scene accurately positioned at the depth corresponding to the slice in which the pixel resides.

19. The apparatus of claim 12, wherein the alpha value for a pixel reflects the degree to which multiple cameras capturing the scene agree that a surface of an object exists at the pixel position within the slice.

20. The apparatus of claim 12, wherein each slice of the virtual color cube is partitioned using the same pattern of tiles.

\* \* \* \* \*